(12) United States Patent
Shrum

(10) Patent No.: US 11,281,674 B2
(45) Date of Patent: Mar. 22, 2022

(54) GROUPING DATA IN A HEAP USING TAGS

(71) Applicant: Acxiom LLC, Conway, AR (US)

(72) Inventor: Thomas Lawrence Shrum, Conway, AR (US)

(73) Assignee: Acxiom LLC, Conway, AR (US)

( * ) Notice: Subject to any disclaimer, the term of this patent is extended or adjusted under 35 U.S.C. 154(b) by 140 days.

(21) Appl. No.: 16/708,073

(22) Filed: Dec. 9, 2019

(65) Prior Publication Data

US 2021/0064626 A1 Mar. 4, 2021

Related U.S. Application Data

(60) Provisional application No. 62/891,679, filed on Aug. 26, 2019, provisional application No. 62/891,683, filed on Aug. 26, 2019, provisional application No. 62/891,689, filed on Aug. 26, 2019.

(51) Int. Cl.
| | |
|---|---|
| G06F 16/21 | (2019.01) |
| G06F 16/22 | (2019.01) |
| G06F 16/2455 | (2019.01) |
| G06F 16/906 | (2019.01) |
| G06F 16/242 | (2019.01) |
| G06F 40/117 | (2020.01) |
| G06Q 30/02 | (2012.01) |
| H04L 67/561 | (2022.01) |

(52) U.S. Cl.
CPC .... *G06F 16/24568* (2019.01); *G06F 16/2246* (2019.01); *G06F 16/244* (2019.01); *G06F 16/906* (2019.01); *G06F 40/117* (2020.01); *G06Q 30/0201* (2013.01); *H04L 67/2804* (2013.01)

(58) Field of Classification Search
CPC ............. G06F 16/24568; G06F 16/244; G06F 16/2246; G06F 16/214; G06F 16/2282; G06F 16/211
USPC ........................................................ 707/722
See application file for complete search history.

(56) References Cited

U.S. PATENT DOCUMENTS

| | | |
|---|---|---|
| 6,295,532 B1 | 9/2001 | Hawkinson |
| 7,882,077 B2 | 2/2011 | Gokhale et al. |
| 8,364,680 B2 | 1/2013 | Bilbrey |

(Continued)

FOREIGN PATENT DOCUMENTS

WO 2019133928 A1 7/2019

OTHER PUBLICATIONS

International Search Report and Written Opinion for Int'l App. No. PCT/US2019/065257 (dated Feb. 26, 2020).

(Continued)

*Primary Examiner* — Kuen S Lu

(57) ABSTRACT

A method of searching data being directed into a data heap looks for the presence of multiple tags on data elements and then applies a group tag to those data elements if all tags of the group are identified. The tags are applied by group tagging applications or "GroupTagApps" (GTAs), which are small, quickly executing software applications that are each focused on the tagging of data that includes a particular set of tags in order to make the identification process rapid. Multiple GTAs in one or both of horizontal and vertical configurations may be constructed in order to provide any necessary level of speed or take full advantage of an available hardware configuration.

19 Claims, 5 Drawing Sheets

(56) References Cited

U.S. PATENT DOCUMENTS

| | | | |
|---|---|---|---|
| 8,397,285 | B2 | 3/2013 | Balakrishnan et al. |
| 8,595,234 | B2 | 11/2013 | Siripurapu et al. |
| 8,666,988 | B2 | 3/2014 | Parthasarathy et al. |
| 8,769,576 | B2 | 7/2014 | Burkitt et al. |
| 8,935,204 | B2 | 1/2015 | Peto et al. |
| 9,098,531 | B2 | 8/2015 | Desmond et al. |
| 9,225,793 | B2 | 12/2015 | Dutta et al. |
| 9,256,667 | B2 | 2/2016 | Koudas et al. |
| 9,286,295 | B2 | 3/2016 | Beadles |
| 9,465,856 | B2 | 10/2016 | Branton et al. |
| 9,524,282 | B2 | 12/2016 | Algreatly |
| 9,710,539 | B2 | 7/2017 | Dey et al. |
| 9,898,748 | B1 | 2/2018 | Taylor et al. |
| 10,097,432 | B2 | 10/2018 | Stevens et al. |
| 10,191,974 | B2 | 1/2019 | Indeck et al. |
| 10,248,719 | B2 | 4/2019 | Sharma et al. |
| 10,250,640 | B2 | 4/2019 | Redlich et al. |
| 2006/0221850 | A1 | 1/2006 | Buckley et al. |
| 2006/0253503 | A1 | 11/2006 | Barrs et al. |
| 2008/0010294 | A1 | 1/2008 | Norton et al. |
| 2008/0288347 | A1 | 11/2008 | Sifry |
| 2014/0019555 | A1 | 1/2014 | Cai et al. |
| 2015/0081701 | A1 | 3/2015 | Lerios et al. |
| 2016/0117393 | A1* | 4/2016 | von Rickenbach .... G06Q 30/06 707/723 |
| 2016/0134667 | A1 | 5/2016 | Suresh et al. |
| 2016/0179849 | A1* | 6/2016 | Dubois ................ G06F 16/211 707/803 |
| 2016/0210657 | A1 | 7/2016 | Chittilappilly et al. |
| 2016/0299977 | A1 | 10/2016 | Hreha |
| 2017/0013127 | A1 | 1/2017 | Xue et al. |
| 2019/0080354 | A1 | 3/2019 | Booker et al. |
| 2020/0007455 | A1* | 1/2020 | Chhabra ............. G06F 21/6218 |

OTHER PUBLICATIONS

"How Custom Tagging Creates a Successful Data Management Strategy," Data Dynamics, Inc., retrieved Jul. 17, 2019.

"TagApp—Apps on Google Play," retrieved Jul. 16, 2019 (Jan. 16, 2016).

Nanculef et al., "Efficient Classification of Multi-Labelled Text Streams by Clashing," arXiv, Apr. 12, 2016.

Atkinson et al., "Near Real Time Information Mining in Multilingual News," WWW 2009 MADRID!, Apr. 23, 2009.

Bharti et al., "Sarcastic Sentiment Detection in Tweets Streamed in Real Time: A Big Data Approach," Digitgal Comm. and Networks 2 (2016) 108-121 (Aug. 1, 2016).

"Event Driven Feeds," Bloomberg Professional Services, retrieved Jul. 17, 2019.

Menon et al., "Fast ASR-Free and Almost Zero-Resource Keyword Spotting Using DTW and CNNs for Humanitarian Monitoring," arXiv, Jun. 25, 2018.

"Marketing Getting Started," Heap, retrieved Jul. 16, 2019.

"Hashtags for Instagram—Apps on Google Play," retrieved Jul. 16, 2019 (Dec. 1, 2018).

* cited by examiner

GROUPING DATA IN A HEAP USING TAGS

CROSS-REFERENCE TO RELATED APPLICATIONS

This application claims the benefit of U.S. Provisional Patent Application Nos. 62/891,679, 62/891,683, and 62/891,689, each of which was filed on Aug. 26, 2019. Each of these applications is incorporated by reference as if fully set forth herein.

STATEMENT REGARDING FEDERALLY SPONSORED RESEARCH OR DEVELOPMENT

Not applicable.

BACKGROUND OF THE INVENTION

Streams of electronic data are used in many applications today. As the quantity of available data continues to increase in many fields, more advanced methods are required for receiving, storing, and cataloging the data. There is a particularly strong need for new methods of cataloging data in applications where the "freshness" of the data is a significant aspect of the value of the data. For example, data indicating that a particular consumer is "in market" for a new truck must be acted on quickly, or the customer may have already made a purchase from a competitor before the data is fully processed, and thus the opportunity will be missed. Another example is data about a consumer's location, since this may change in an extremely short timeframe. For example, it may be valuable to know that a consumer is standing near a particular retailer or driving toward a particular coffee shop, in which case marketing messages from these retailers may be more effective if they reach the consumer before the opportunity has passed. Thus although these kinds of data may be highly valuable, they become worthless if the data cannot be processed quickly enough to act before the opportunity passes. If one waits to use the data until after all of the processing, writing of data to storage, and formatting and cataloging of data has been complete as in traditional data processing systems, then it may be too late to meaningfully use the data and the value of the data has been lost.

BRIEF SUMMARY OF THE INVENTION

The present invention is directed to a method and system by which an enterprise may scan data after it arrives over a network and after it is tagged with individual tags, but before it is fully formatted, in order to look for a specific group of individual tags and group tag all such items of data that are found. The individual tags may be applied in any manner, including but not limited to primary or secondary data tagging applications. The group tags are applied by group tagging applications or "GroupTagApps" (GTAs), which are a set of small, quickly executing software applications that are each focused on the tagging of data with particular individual data tags that have already been applied. Because of the focused nature of the GTAs, the identification process for these groups of tags may be made as rapid as possible. In certain embodiments, the GTAs are run against the data after it is stored and written to a data structure maintained by the enterprise, but before all data for a given file are written to that data structure. Because the group tags are applied to the data while the data structure is still being filled, rather than after the complete data structure has been constructed, information from the group tag will be available very quickly, enabling the enterprise to act very quickly in response to the group tags, rather than waiting for the completion of the relevant data structure. In this way, the process and system allows very quick action to be taken in order to maximize the usefulness of the data, in some cases allowing for a real-time response.

These and other features, objects and advantages of the present invention will become better understood from a consideration of the following detailed description in conjunction with the drawings.

DRAWINGS

DETAILED DESCRIPTION OF THE PREFERRED EMBODIMENT(S)

Figure 1:
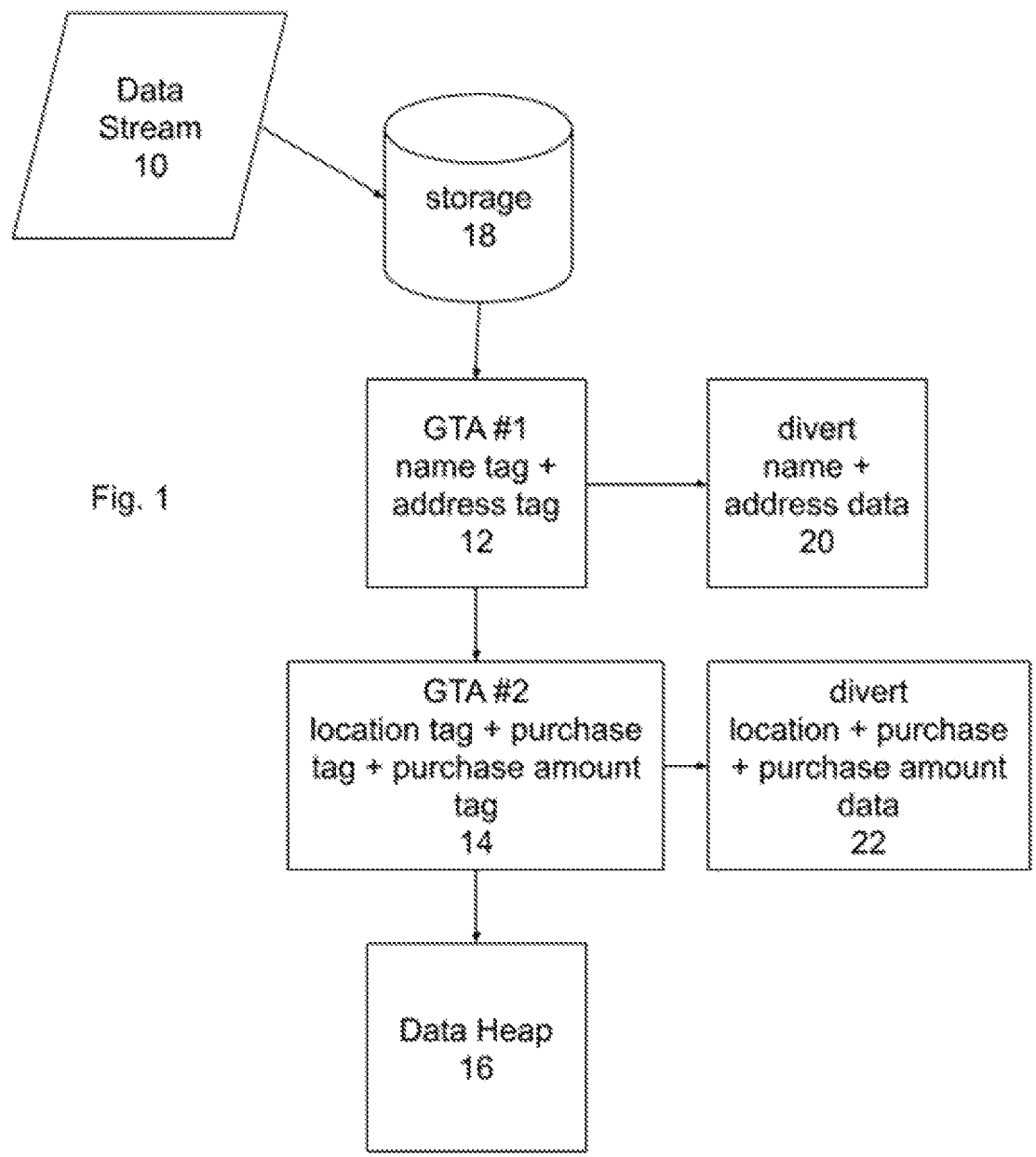
FIG. 1 is an exemplary data flow diagram according to an implementation of the invention showing two different group tagging applications or "GroupTagApps" (GTAs) functioning to group tag incoming data.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

In the first step of a process according to an implementation of the invention, a variety of data is sourced from many different potential sources. These sources may include the Internet (such as from companies like Amazon, WhatsApp, and Instagram); Internet of Things (IoT) devices such as web cameras, refrigerators, and home automation devices; or from customer data files. As the data streams in over a network, it is written to storage by the enterprise. The enterprise then begins organizing the data using a data structure such as a heap. For purposes herein, a heap may be considered as a tree-based data structure, in particular a binary tree, in which a key value in a parent node is always greater than or equal to the key value in a corresponding child node (a max tree) or always less than or equal to the key value in such corresponding node (a min tree). Although such data structures are useful in a wide variety of applications, constructing the heap takes processing time, which would delay the ability to use the incoming data if the data were not placed into use until all data had been written into the data structure. For this reason, tags may be applied to the data prior to the completion of all data being written into the data structure. In certain implementations, these tags may include primary field tags, which are tags applied to data as it streams into the system and is found to contain certain types of data elements, such as, for example, "name" or "address" data. These tags may also include secondary field tags, which are tags applied to data after it has been received and stored by the system, but before the data is organized into a data structure such as a data heap. The tags may further include any other type of data tagging system and may include tags applied to the data for any other purpose. After tagging, and before the data is formatted and stored in the data heap, group data tagging applications ("GroupTagApps" or GTAs) focused on a group of tags (e.g., name and address; location, purchased item, and purchase amount; etc.) peruse the items of data as they are being added to the heap. Upon finding the group of tags that each GTA is looking for, it tags the data appropriately and continues to peruse other data being added to the heap. For example, suppose that a GTA (or multiple GTAs acting in concert) are employed to tag data that contains a particular group of tags for purposes of identification. The GTA (or group of GTAs) in this case are looking for tags that indicate the presence of both "name" and "address" data. In this way, important information may be known about the data quickly, without waiting to complete the entire heap data structure. With enough different GTAs sifting through the items of data as they are added to the heap, a great deal of information may be known about the data quickly, without waiting to complete the entire heap data structure. The group tagged data may be sent directly to a marketing process for use of the data in real time, or may be stored in a tagged element database in order to make it acceptable to other processes.

GTAs can be scaled in a manner that makes them more efficient. For example, GTAs may be scaled vertically by running the GTAs on multiple processors or multiprocessor architectures comprising multiple cores. In addition, GTAs may be scaled horizontally by having multiple different GTAs running simultaneously. Of course even greater efficiency can be achieved by scaling the GTAs both vertically and horizontally, thereby handling data volumes of any size efficiently by scaling up the GTAs in a manner corresponding with the data volume.

A GTA should be scaled horizontally (i.e., another app identical in function to the original begins to function) whenever the ratio of time performing work to passed time becomes greater than 1:2. For example, an app would scale whenever it takes 1 second performing its task over a period of 2 seconds.

A GTA should be scaled vertically (e.g., another computer having identical software installed to the original begins to function) whenever the estimated average time for any of memory, CPU, disk, or I/O buses to achieve 67% of maximum is less than the time it takes to scale (TTS). For example, if TTS is 5 minutes, then a computer would scale when 23% of total memory is being used and memory usage is increasing on average by 11% per minute over the past minute (time to 67% of memory is 4 minutes while TTS is 5 minutes).

A GTA should vertically de-scale (e.g., a computer would remove itself from the pool of computing resources) whenever doing so would not cause an GTA scale event, either horizontally or vertically.

GTAs may be applied where data would need to be processed immediately in order to reap the greatest value from that data. For instance, name and address data could be used to identify consumers in advance of other processing.

Referring now to FIG. 1, a flow chart illustrates the steps in the process for making use of certain implementations of the present invention. A connection is made to data stream 10, and the unstructured data is written to storage 18 by the enterprise. In this case, data stream 10 is consumer records, but the data stream can be any type of electronic information in other implementations. As the items of data are being added to data heap 16, they are tagged for the presence of individual types of data. The data is passed to a controller or controllers that host multiple GTAs. GTA #1, at block 12, searches the stream for the target group of tags, in this example being the "name" tag and the "address" tag. If the tag grouping is found, then the data is tagged with the "name+address" group tag, and optionally may be diverted from the main data stream (or a copy diverted from the main data stream) in order to immediately or later make use of this information at step 20. Multiple different GTAs may exist on the same computer core. GTA #2 at block 14 performs a similar process for the grouping of "location" tag with "purchase" tag and "purchase amount" tag. The data associated with the "location+purchase+purchase amount" group tag may be diverted at step 22. All of this processing takes place before the data from data stream 10 is added to the heap data structure at data heap 16. Although two GTAs each for a different data element are shown, it will be understood that any number of GTAs could be employed in various alternative implementations.

Figure 2:
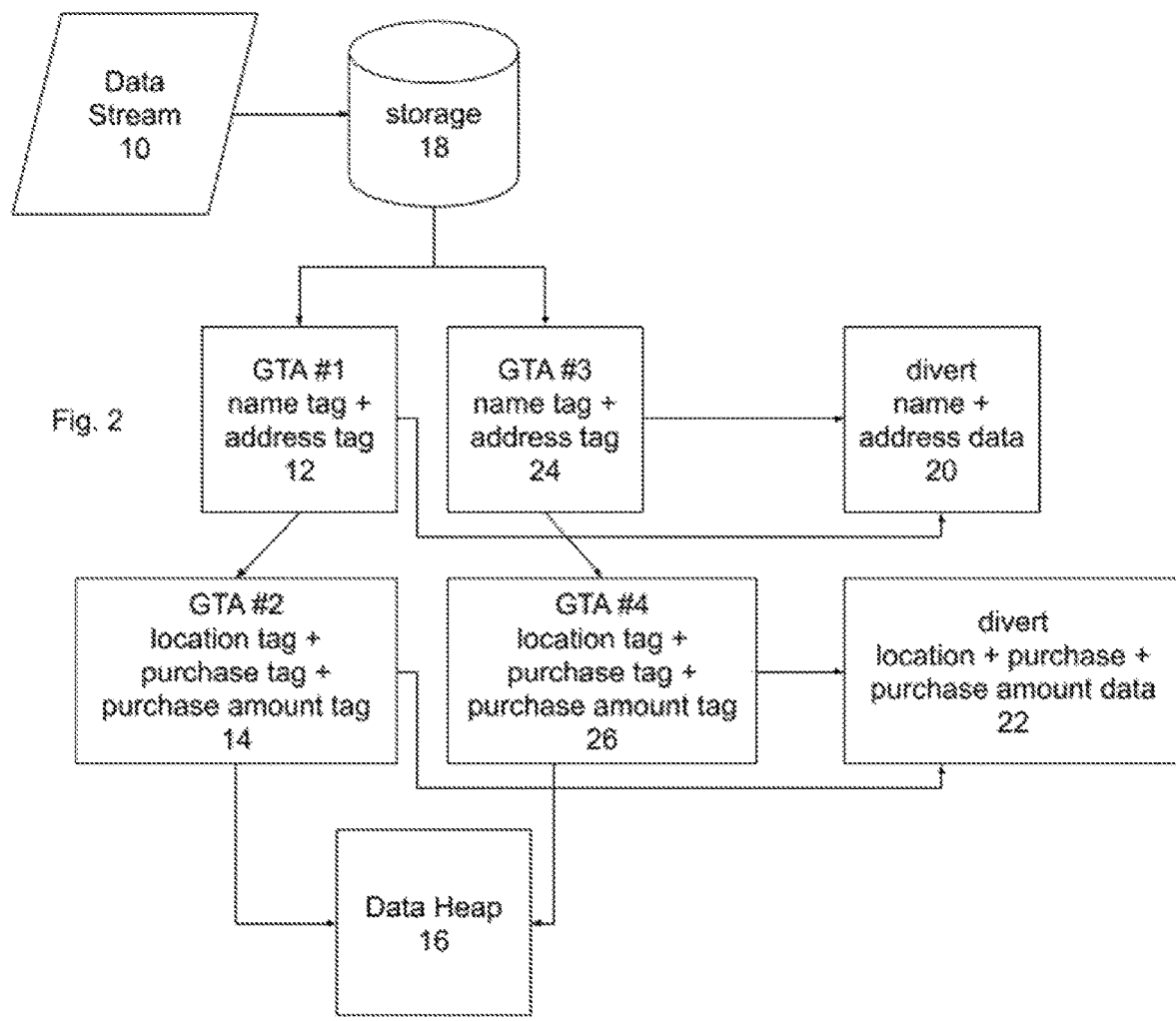
FIG. 2 is an exemplary data flow diagram according to an implementation of the invention using vertically scaled GTAs to group tag incoming data.

Referring to FIG. 2, a different arrangement is shown where the GTAs are scaled vertically for greater efficiency. In this case, data stream 10 is sent to storage media 18, but then is divided into two parallel streams to facilitate parallel processing. In this model, there may be multiple compute cores that each run an instantiation of the same GTA, as well as multiple different GTAs running on the same compute core. New GTA #3 at block 24, GTA #4 at block 26, provide parallel searching for the "name" and "address" tag grouping, and the "location" and "purchase" and "purchase amount" tag grouping, respectively. All four GTAs optionally divert data once tagged as explained above with reference to FIG. 1, in this case GTAs #1 and #3 diverting data tagged with the "name+address" group tag at step 20, and GTAs #2 and #4 diverting data tagged with the "location+purchase+purchase amount" group tag at step 22. As in the example of FIG. 1, all of this processing takes place before the data from data stream 10 is stored or formatted in data heap 16. It may be seen that by arranging the GTAs in this manner and given a hardware platform with sufficiently parallel resources, the system can keep up with the rate of the data flow no matter how fast the data from data stream 10 comes in. The degree to which the processing is scaled vertically therefore can be a function of how fast the corresponding data stream 10 will operate.

Figure 3:
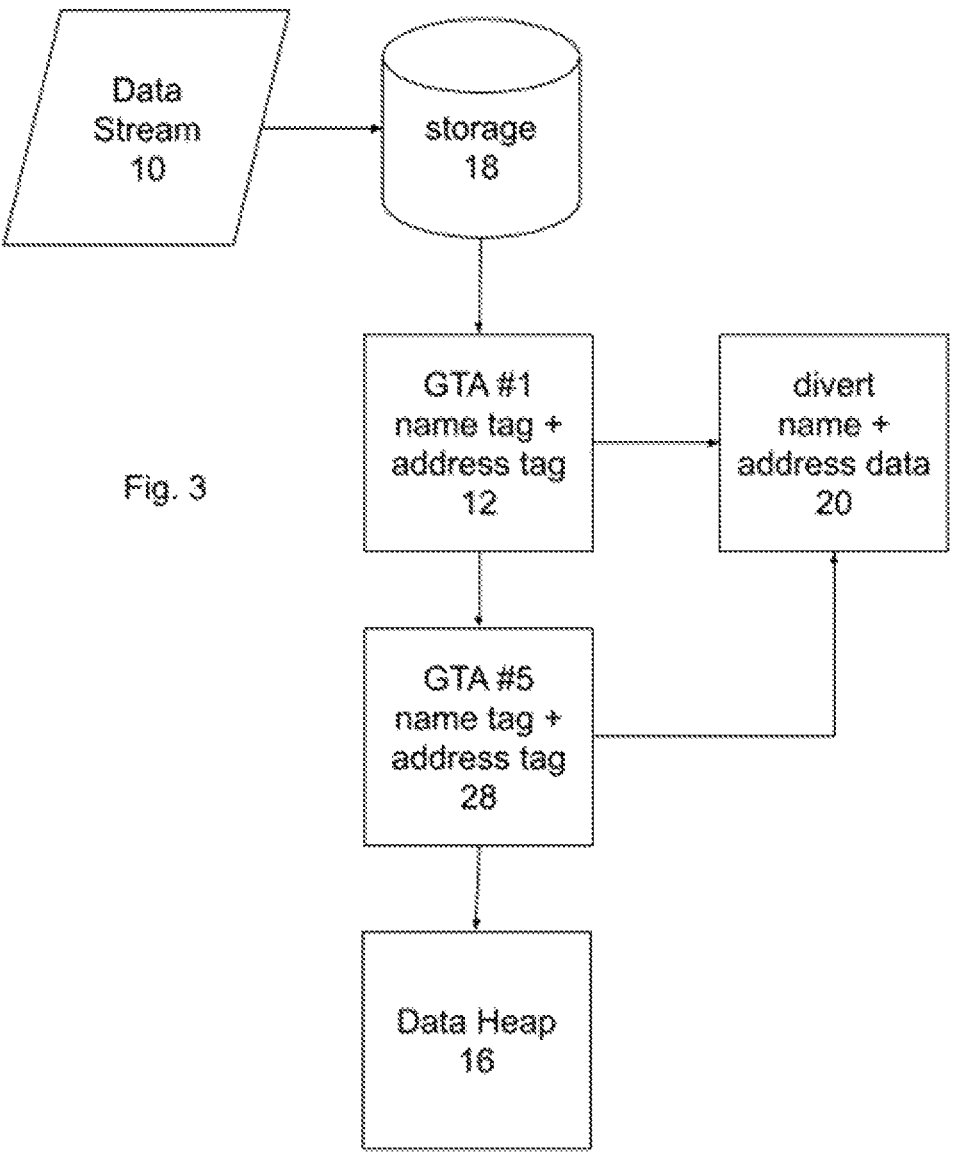
FIG. 3 is an exemplary data flow diagram according to an implementation of the invention using horizontally scaled GTAs to group tag incoming data.

Referring to FIG. 3, a different arrangement is shown in which the GTAs are scaled horizontally for greater efficiency. In this case, data stream 10 sends data to storage 18, and then the items of data are passed through two different GTAs for the grouping of the "name" and "address" tags, blocks 12 and 28, which are aligned in a "horizontal" fashion, that is, such that they are each searching data from the same data stream 10 at the same time, before the data is formatted at data heap 16. In one implementation from this example, each GTA may search a subset of the data elements as the data stream passes through, and thus all elements are searched in the data stream but the data stream may be searched more quickly as a whole. Each of the two GTAs may divert data tagged for the group "name+address" at block 20. As noted above, an arrangement that combines the features shown in FIG. 2 and FIG. 3 is another embodiment of the invention, which may produce the greatest efficiency. Thus the design may take full advantage of multiple compute cores each running an instantiation of the same GTA, and each compute core may run either a single GTA or an array of the same or different GTAs, in order to adequately inspect the data stream so that all data are appropriately tagged. Either of the versions of FIG. 2 and FIG. 3, or the combination thereof, may be scaled to any arbitrary level to manage as large of a data feed 10 as is needed and as many different types of tags as may be useful for any particular application.

While data continues to be sent to data heap 16 for formatting, GTA-tagged data elements may be sent via an application programming interface (API) for immediate processing, ahead of the time at which the data is fully formatted at data heap 16. Alternative embodiments may use a method other than an API in order to begin the processing of data before being written to storage at the enterprise, depending upon the particular application to which the various embodiments of the method and system is being applied.

Figure 4:
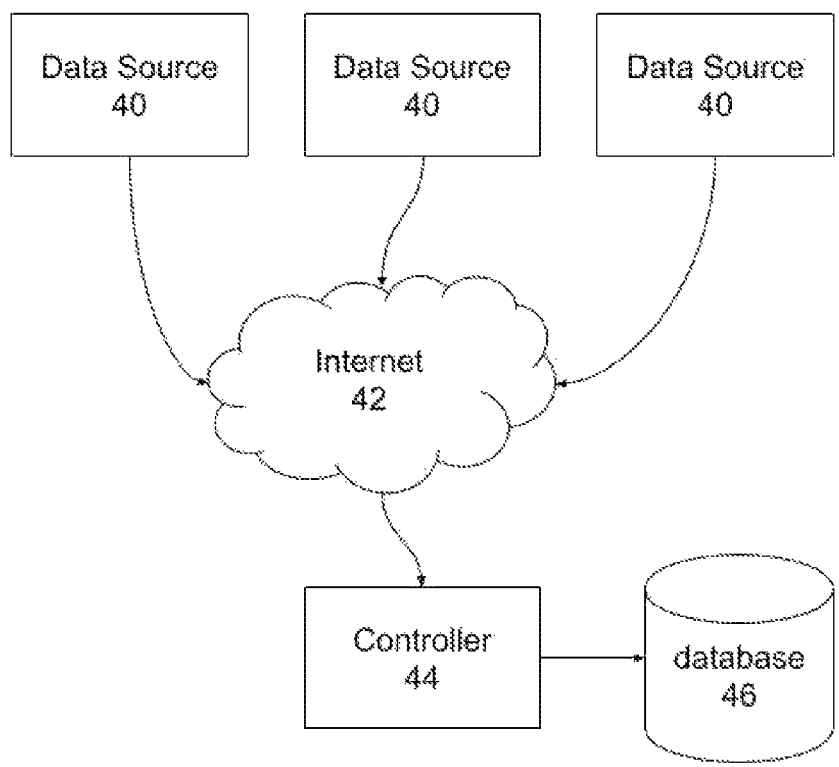
FIG. 4 is a diagram of a system according to an implementation of the invention.

The elements that make up a system according to an implementation of the invention are shown on FIG. 4. Multiple data sources 40 are connected to controller 44 over Internet 42. In this way, data is fed into the system as described previously. Controller 44 is where the processing of the data occurs. Controller 44 is in communication with storage 46, which is where the results of the processing are stored after formatting and cataloguing in data heap step 16.

Figure 5:
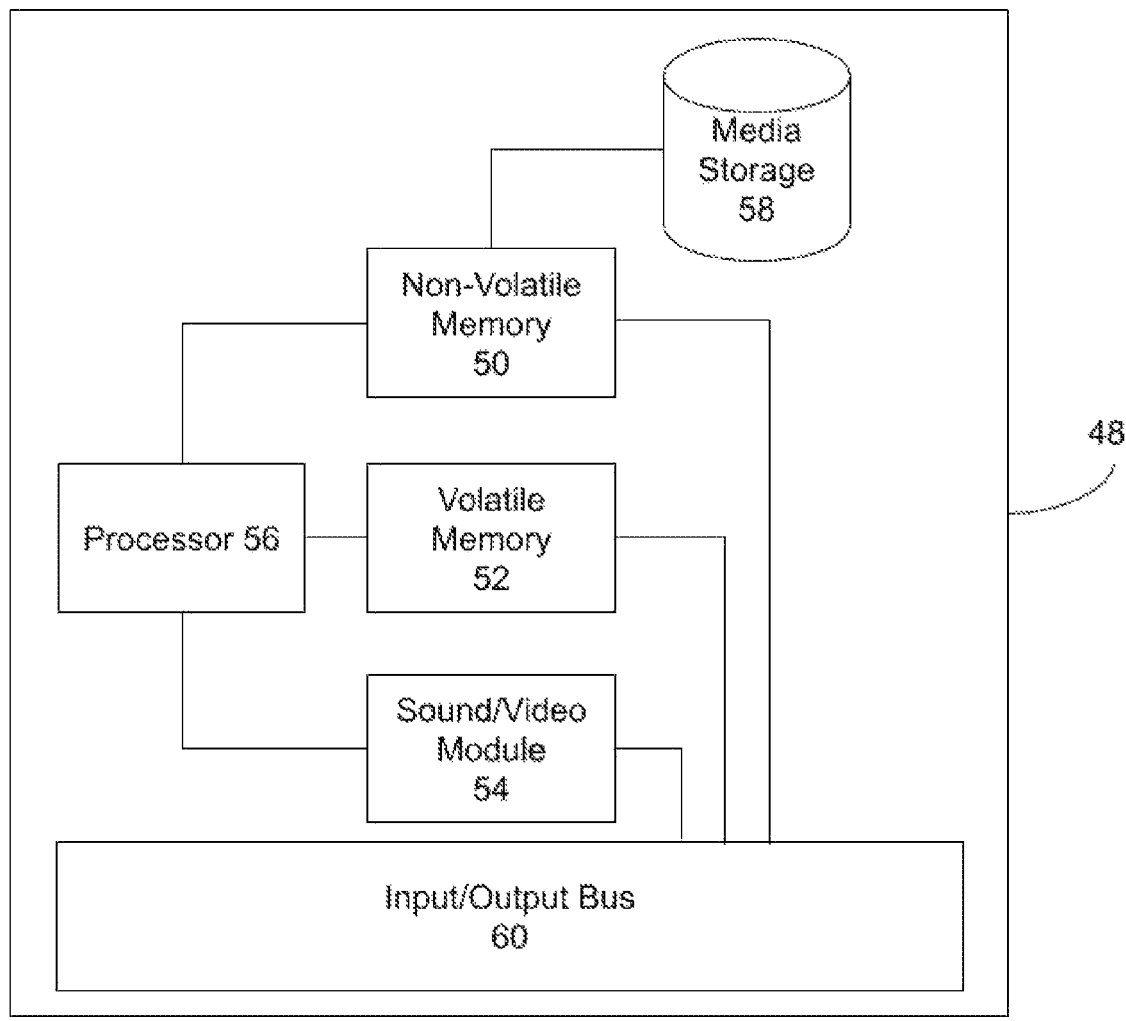
FIG. 5 is a diagram of a computing device according to an implementation of the invention.

A computing system 48 that may be used to implement controller 44, as shown in FIG. 5. Generally, computing system 48 may include digital storage such as a magnetic disk, an optical disk, flash storage, non-volatile storage, or other storage devices. Data and instructions may be stored in the digital storage such as in a database. The computing system 48 may have a processor 56 that is physically configured to best process executable instructions. It may also have an optional sound/video module 54, which operates to display video and play sound. The computing system 48 may also have volatile memory 52, such as solid-state RAM memory in one or more levels or caches, and non-volatile memory 50. There also may be an input/output bus 60 that transmits data and/or instructions to and from the various user input/output devices, such as a keyboard or monitor (not shown). The input/output bus 60 also may control communications with other devices, either through wireless or wired devices.

The storage 46 of FIG. 4 may be integrated into the media storage 58 of FIG. 5, or may be physically separate. The storage 46 may also be part of a cloud of computing devices and may be stored in a distributed manner across a plurality of computing devices.

The user devices, computers and servers described herein may be general purpose computers that may have, among other elements, a microprocessor; volatile and/or non-volatile memory; one or more mass storage devices (i.e., a hard drive); various user input devices, such as a mouse, a keyboard, or a microphone; and a video display system. The user devices, computers and servers described herein may be running on any one of many operating systems. The servers may be a cluster of web servers, which may each be supported by a load balancer that decides which of the cluster of web servers should process a request based upon the current request-load of the available server(s). The devices described herein may communicate via networks, including the Internet, WAN, LAN, Wi-Fi, other computer networks, and/or any combination of them. These may be implemented as wired and wireless conduits, including copper, fiber optic, microwaves, and other forms of radio frequency, electrical and/or optical communication techniques. It should also be understood that any network may be connected to any other network in a different manner. The interconnections between computing systems described here are examples. Any device described herein may communicate with any other device via one or more networks. The example embodiments may include additional devices and networks beyond those shown. Further, the functionality described as being performed by one device may be distributed and performed by two or more devices. Multiple devices may also be combined into a single device, which may perform the functionality of the combined devices.

Any of the software components or functions described in this application, may be implemented as software code or computer readable instructions that may be executed by at least one processor using any suitable computer language such as, for example, Java, C++, or Python.

The software code may be stored as a series of instructions or commands on a non-transitory computer readable medium, such as a random-access memory (RAM), a read-only memory (ROM), a magnetic medium such as a hard-drive or a floppy disk, or an optical medium such as a CD/DVD-ROM. Any such computer readable medium may reside on or within a single computational apparatus and may be present on or within different computational apparatuses within a system or network.

Generally speaking, a non-transitory computer readable medium may include electronic, magnetic, or optical media—e.g., disk or CD/DVD-ROM. The terms "tangible" and "non-transitory," as used herein, are intended to describe a computer-readable storage medium (or memory) excluding propagating electromagnetic signals, but are not intended to otherwise limit the type of physical computer-readable storage device that is encompassed by the phrase computer-readable medium or memory. For example, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a wired or wireless network.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included in the disclosure. When a range is mentioned herein, the disclosure is specifically intended to include all points in that range and all sub-ranges within that range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as presented in the following claims.

The invention claimed is:

1. A method for group tagging of data, comprising the steps of:
   a. receiving a data stream at a controller, wherein the data stream comprises a plurality of data elements being directed into a data heap, wherein the data heap comprises a binary tree data structure comprising a plurality of nodes, in which a key value in a parent node within the data heap is always greater than or equal to the key value in a child node corresponding to the parent node, or always less than or equal to the key value in the child node corresponding to the parent node, and wherein at least one of the plurality of data elements comprise a first field tag and a second field tag;
   b. before storing each data element in the data heap, applying a first group tagging application to each data element, wherein the first group tagging application searches for a match to both a first target field tag and a second target field tag;
   c. if a match with the first target field tag and second target field tag is found, group tagging such element with a first group tag indicating that a match exists with both the first target field tag and the second target field tag, wherein the group tagging is performed before storing each data element in the data heap; and
   d. after applying the first group tagging application to the data stream, storing each element in the data stream at one of the plurality of nodes in the data heap.

2. The method of claim 1, further comprising the steps of:
   a. applying a second group tagging application to each data element, wherein the second group tagging application searches for a match to a third target field tag and a fourth target field tag, wherein the first target field tag, second target field tag, third target field tag, and fourth target field tag are all different from each other; and
   b. if a match with the third target field tag and fourth target field tag is found, group tagging such element with a second group tag.

3. The method of claim 1, wherein steps (b) and (c) are performed before any element in the data stream is formatted.

4. The method of claim 1, wherein steps (b) and (c) are performed before any element in the data stream is catalogued.

5. The method of claim 1, wherein the step of group tagging each element comprises the step of appending one or more of a text string, a number, or a code to the element.

6. The method of claim 1, wherein the step of group tagging the element comprises the step of making a copy of the element and sending the copy of the element to one or both of an application programming interface or a group tagged element database.

7. The method of claim 1, wherein the step of group tagging the element comprises the step of moving the element from the data stream such that the element is not stored in the data heap at step (d).

8. The method of claim 1, further comprising the steps of:
   a. after receiving the data stream at the controller, dividing the data stream into first and second data streams each containing a plurality of elements;
   b. applying the first group tagging application to each element in the first data stream, and simultaneously applying a third group tagging application to each element in the second data stream, wherein the first and third group tagging applications search for a match to both the first target field tag and the second target field tag; and
   c. if a match is found by either the first or third group tagging applications, group tagging such element with the first group tag.

9. The method of claim 8, further comprising the steps of:
   a. applying the second group tagging application to each element in the first data stream, and simultaneously applying a fourth group tagging application to each element in the second data stream, wherein the second and fourth group tagging applications search each element in the second data stream for a match to both a third target field tag and a fourth target field tag; and
   b. if a match is found by either the second or fourth group tagging applications, group tagging such element with a second group tag.

10. The method of claim 9, further comprising the step of running the first and third group tagging applications on different physical processors, or on different cores of the same processor, and the step of running the second and fourth group tagging applications on different physical processors, or on different cores of the same processor.

11. One or more non-transitory computer readable storage media, having computer-executable instructions embodied thereon, wherein when executed by at least one processor, the computer-executable instructions cause the at least one processor to:
   a. receive a data stream at a controller, wherein the data stream comprises a plurality of elements being directed into a data heap, wherein the data heap comprises a binary tree data structure comprising a plurality of nodes, in which a key value in a parent node within the data heap is always greater than or equal to the key value in a child node corresponding to the parent node, or always less than or equal to the key value in the child node corresponding to the parent node;
   b. before storing each data element in the data heap, apply a first group tagging application to each element to search each element for a match to a first target tag and a second target tag;
   c. if a match is found to the first target tag and the second target tag, group tag the element having the matched first target tag and second target tag with a first group tag indicating that a match exists with both the first target field tag and the second target field tag, wherein the group tagging is performed before storing each data element in the data heap; and
   d. after applying the first group tagging application to the data stream, store each element in the data stream at one of the plurality of nodes in the data heap.

12. The storage media of claim 11, wherein the computer-executable instructions further cause the one or more processors to:
   a. apply a second group tagging application to each element to search for a match to a third target tag and a fourth target tag, wherein the first target tag, second target tag, third target tag, and fourth target tag are all different from each other; and
   b. if a match is found to the third target tag and the fourth target tag, tag the element having the matched third target tag and fourth target tag with a second group tag.

13. The storage media of claim 11, wherein the computer-executable instructions cause processes (b) and (c) to be performed before any element in the data stream is formatted.

14. The storage media of claim 11, wherein the computer-executable instructions cause processes (b) and (c) to be performed before any element in the data stream is catalogued.

15. The storage media of claim 11, wherein the computer-executable instructions cause the one or more processors to append one or more of a text string, a number, or a code to each tagged element.

16. The storage media of claim 11, wherein the computer-executable instructions cause the one or more processors to make a copy of the element and send the copy of the element to one or both of an application programming interface or a group tagged element database.

17. The storage media of claim 11, wherein the computer-executable instructions cause the one or more processors to move the element from the data stream such that the element is not stored in the data heap.

18. The storage media of claim 11, wherein the computer-executable instructions further cause the one or more processors to:
   a. after receiving the data stream at the controller, divide the data stream into first and second data streams each containing a plurality of elements;
   b. apply the first group tagging application to each element in the first data stream, and simultaneously apply a second group tagging application to each element in the second data stream, wherein the first and second group tagging applications search each element in the first data stream for a match to the first target tag and the second target tag;
   c. if a first target tag and second target tag match is found by either the first or second group tagging applications, group tag the element having the matched first target element with a group tag.

19. The storage media of claim 18, wherein the computer-executable instructions further cause the one or more processors to run the first and second group tagging applications on different physical processors, or on different cores of the same physical processor.

* * * * *